United States Patent [19]

Moore et al.

[11] 4,210,177
[45] Jul. 1, 1980

[54] POSITIVE RESET SAFETY CONTROL SYSTEM FOR FRYING APPARATUS

[75] Inventors: L. Frank Moore; George M. Price, both of Shreveport, La.

[73] Assignee: The Frymaster Corporation, Shreveport, La.

[21] Appl. No.: 953,078

[22] Filed: Oct. 20, 1978

Related U.S. Application Data

[62] Division of Ser. No. 753,936, Dec. 23, 1976.

[51] Int. Cl.² ............................................. F16K 35/00
[52] U.S. Cl. ..................................................... 137/613
[58] Field of Search ........... 251/129; 137/613, 624.11; 126/351, 374; 361/193; 99/331, 330, 408

[56] References Cited

U.S. PATENT DOCUMENTS

| | | | |
|---|---|---|---|
| 2,527,136 | 10/1950 | Kagi et al. | 137/613 |
| 2,891,577 | 6/1959 | Stewart, Jr. | 137/613 |
| 3,071,063 | 1/1963 | Churley | 99/332 |
| 3,174,502 | 3/1965 | Howarth et al. | 137/351 |
| 3,368,682 | 2/1968 | Boots | 99/408 |
| 3,495,525 | 2/1970 | Pitrowski | 99/403 |
| 3,754,565 | 8/1973 | Gennetten | 361/193 |
| 3,992,984 | 11/1976 | Trieber | 99/330 |
| 4,102,330 | 7/1978 | Hutchinson | 99/331 |

Primary Examiner—Martin P. Schwadron
Assistant Examiner—A. Michael Chambers
Attorney, Agent, or Firm—Hubbard, Thurman, Turner, Tucker & Glaser

[57] ABSTRACT

Frying apparatus including a fry pot and a filter system operable during a cleaning cycle for dislodging food particles which cling to the fry pot and for removing food particles suspended in the cooking oil is disclosed. The filter system includes a shower apparatus which discharges jets of cooking oil along the interior side surfaces of the fry pot to dislodge food particles clinging thereto. The cooking oil is drained into a drain pan, strained through a filter and means are provided for pumping the filtered cooking oil back to the fry pot where it is discharged through the shower apparatus. Food particles are continuously separated from the cooking oil as it is conveyed from the fry pot through the filter into the drain pot. In a preferred embodiment, a control circuit is provided for automatically turning off the fry pot heaters when the cooking oil is drained during the filter cycle. The control circuit includes means for locking the fry pot heating system in the off condition when the draining operation occurs. Reset is accomplished by first turning the fry pot off and then back on to insure that the operator exercises positive control before the heating system is energized.

1 Claim, 10 Drawing Figures

POSITIVE RESET SAFETY CONTROL SYSTEM FOR FRYING APPARATUS

This is a division of application Ser. No. 753,936, filed Dec. 23, 1976.

BACKGROUND OF THE INVENTION

1. Field of the Invention

The invention relates to apparatus for deep fat frying, and more particularly to a filter system for removing food particles therefrom and to control means for safely implementing the filter system.

2. Description of the Prior Art

Conventional deep fat frying systems include a fry pot for containing cooking oil and means for heating the oil to cook a portion of food. From time to time it is necessary to clean the fry pot to remove food particles which cling to the sides of the fry pot and to filter the cooking oil to remove food particles which are suspended within the cooking oil. The cooking oil, which is relatively expensive, must be kept clean in order to extend its useful life. The presence of old food particles in the cooking oil causes it to smoke, impairs the heat transfer efficiency of the oil, and imparts a disagreeable flavor to the food portions. In some operations, for example in the preparation of fried chicken which is heavily breaded, the cooking oil must be drained and filtered several times a day in order to remove bread crumbs, food particles and other solid wastes that accumulate during cooking.

According to conventional practice, the fry pot may be cleaned manually by directing a stream of hot cooking oil through a hose which is held by an operator. Food particles flushed away by the hot cooking oil are drained into a drain pan which in some cases must be hand carried to a sink or suitable reservoir and emptied. The operator must wear protective clothing such as gloves when handling the hose during the flushing operation.

Because the cooking oil may be extremely hot, for example 350° Fahrenheit or higher, the operator and his co-workers are exposed to the risk of serious burn injury from the inadvertent or accidental splashing of hot cooking oil during the cleaning operation. Further, the fry pot may be damaged if the operator drains the cooking oil from the fry pot without turning off the heating system. In electrically heated fry pots, the application of power to the electrical heating elements in the absence of cooking oil will cause them unnecessary damage and may possibly cause a fire as the residual film of cooking oil on the heating elements ignites. In the case of gas heated fry pots, the heat transfer surfaces will likewise be overheated, causing warping damage or a fire.

In modern convenience restaurants which feature breaded foods such as fried chicken, fish, and potatoes, the fry pot must be drained several times a day in order to remove bread crumbs, food particles and other solid wastes that accumulate during cooking. Various means have been provided for raising and tilting the fry pot to pour used cooking fluid into an adjacent drain pan, which in some cases must be hand carried to a sink and emptied into a sump. In such an operation, the cooking cycle on adjacent fryers must sometimes be interrupted during the pouring step in order to avoid exposing the operator's co-workers to the risk of being burned by the accidental splashing of the cooking oil. The cost of the delay in operations is substantial for fast service convenience restaurants; however, it is essential that the cooking oil and fry pot be cleaned periodically for the reasons outlined above. Therefore, it is desirable to provide frying apparatus in which the fry pot and cooking oil may be cleaned safely without exposing the operator and his co-workers to the risk of burn injuries from the hot cooking oil and without interrupting frying operations in adjacent fry pots as the draining and filtering occurs.

SUMMARY OF THE INVENTION

It is an object of the present invention to provide a filter system for use with a fry pot of the type which is mounted in a console with other fry pots which can be safely used for removing food particles from the fry pot and from the cooking oil at the same time that cooking operations are being carried on in adjacent fry pots. It is also an object of the present invention to provide structure and control means for safely implementing the filter system.

According to one aspect of the present disclosure, the invention may be practiced in combination with a plurality of fry pots disposed in a console for the preparation of fried foods. The filter system is operable during a cleaning cycle for dislodging food particles which cling to the fry pot and for removing food particles which are suspended in the cooking oil. The filter system includes a shower apparatus which is disposed in nesting engagement with the interior walls of the fry pot and discharges jets of cooking oil along the interior side surfaces to dislodge food particles which cling to the sides thereof. The cooking oil is strained through a filter into a drain pan and means are provided for pumping the filtered cooking oil back to the fry pot where it is discharged through the shower apparatus. In this operation, food particles are continuously separated from the cooking oil as it is conveyed from the fry pot through the filter into the drain pan. The drain pan is conveniently enclosed in a compartment of the console so that cooking operations may be carried on without interference with an adjacent fry pot as the flushing, draining and filtering process occurs.

In a preferred embodiment of the invention, a control circuit is provided for automatically turning off the fry pot when the cooking oil is drained during the filter cycle. The control circuit includes means for locking the fry pot heating system in the off condition when the draining operation occurs. Additional control circuitry is included to provide that reset to the cooking mode of operation can only be accomplished by first turning the heating means off and then back on to ensure that the operator exercises positive control before the heating system may be reenergized.

DETAILED DESCRIPTION OF THE PREFERRED EMBODIMENT

Figure 1:
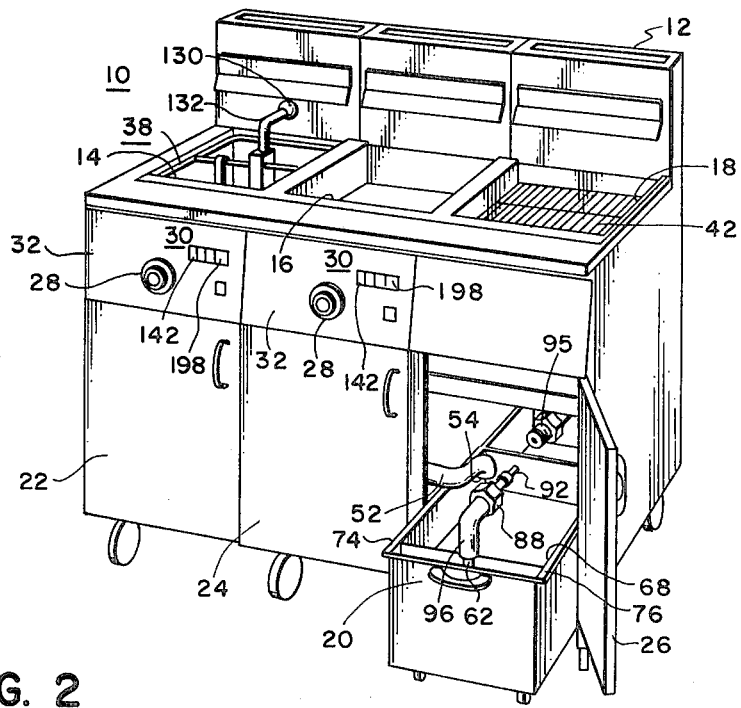
FIG. 1 is a perspective view of a cooking system incorporating the present invention.
Figure 2:
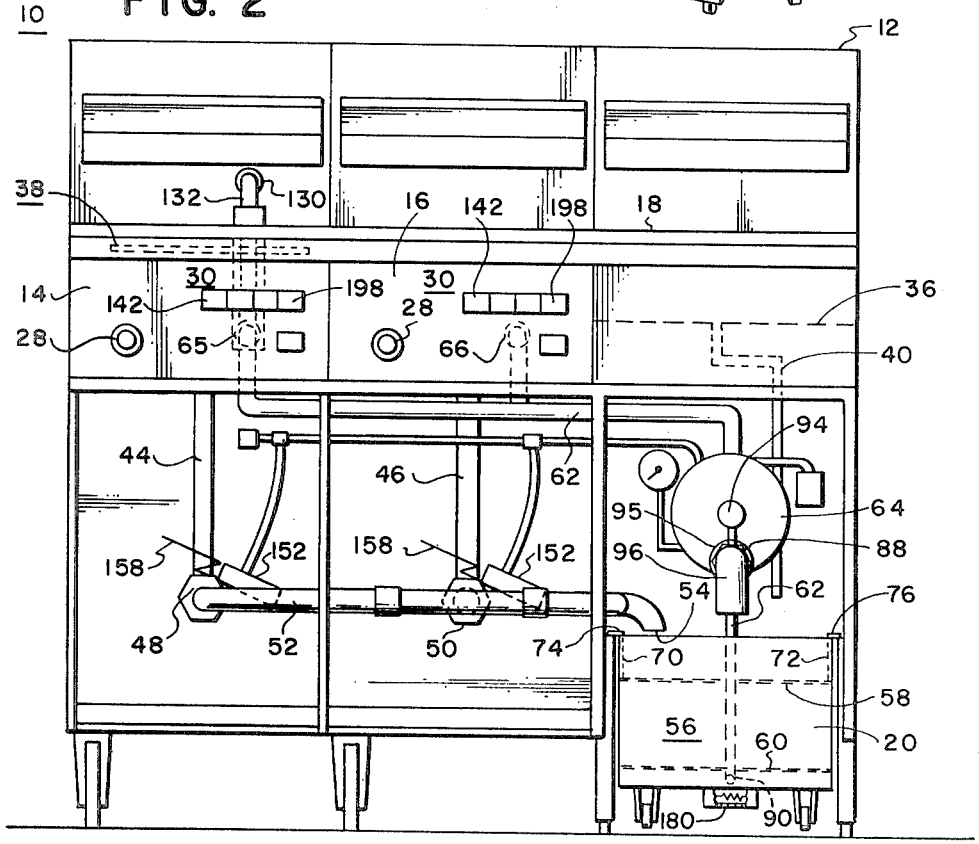
FIG. 2 is a front elevation view, partly cut away, of the cooking system of FIG. 1.

Referring now to FIGS. 1–4, a cooking system 10 is shown incorporating the present invention. The cooking system 10 is contained within a console 12 which includes a fry pot unit 14 and a fry pot unit 16 disposed in side-by-side relation. Also included is a utility cabinet 18 for housing a drain pan 20 and other apparatus. Hinged cabinet doors 22, 24, and 26 permit access to interior regions of the console 12. A temperature control dial 28 and various on-off switches are conveniently clustered in an assembly 30 on a front panel portion 32 of each frying unit.

The fry pot 14 is of the open-top variety and is preferably integrally formed with the countertop surface of the console 12. The fry pots 14, 16 and the drain pan 20 are preferably made of stainless steel.

The on-off switch assembly 30 is connected to control the application of electrical current to an electrical resistance heating element 34 which is disposed within the fry pot units 14, 16 in direct heat transfer relation with the pool of cooking oil disposed within the fry pot. A gas burner (shown in FIGS. 9, 10 and discussed hereinafter) may also be used to good advantage. The heating elements 34 may be of the dual-controlled, full-on or thermostatically-regulated type. The heating elements and thermostatic controls therefor may be constructed as disclosed and claimed in U.S. Pat. No. 3,870,859, which is hereby incorporated by reference.

A recessed storage compartment 36 is disposed in the utility cabinet 18. The stainless steel countertop of the console 12 is pivotally hinged at the rear. The operator lifts the front edge of the stainless steel top, thereby exposing the storage compartment 36. This compartment may be used to store a shower apparatus 38 when it is not in use. The storage compartment 36 includes a drain line 40 which is connected to drain cooking oil out of the storage compartment and into the drain pan 20. A drain rack 42 may also be disposed in the storage compartment 36 to provide a temporary storage area on which prepared food may be placed before or after frying.

Cooking oil is drained from the fry pot 14, 16 through drain conduits 44, 46, respectively. The drain conduits 44, 46 may be selectively opened and closed by drain valves 48, 50 during a filter cycle for conveying cooking oil and food particles entrained therein from the fry pots 14, 16 to the drain pan 20. The drain valves 48, 50 are operably connected in series fluid circuit relation with the drain conduits 44, 46, respectively and are operable to selectively open the drain conduit to which it is attached during the filter cycle and for closing the drain conduit during the cooking cycle. The drain conduits 44, 46 are joined to a common drain conduit 52 which has an outlet port 54 disposed over the drain pan 20 for discharging cooking oil therein.

A filter assembly 56 including a sieve 58 for collecting coarse food particles and a porous medium 60 such as filter paper or cloth for collecting relatively fine food particles passed by the sieve are disposed within the drain pan 20. Cooking oil which is passed by the sieve 58 and the porous filter medium 60 is returned to the shower apparatus 38 by means of a return conduit 62 and a pump 64. Food particles which are entrained in cooking oil conveyed by the common drain conduit 52 are continuously separated from the cooking oil as it is conveyed from the fry pot through the filter assembly 56 into the drain pan 20 and back to the fry pot 14.

Figure 10:
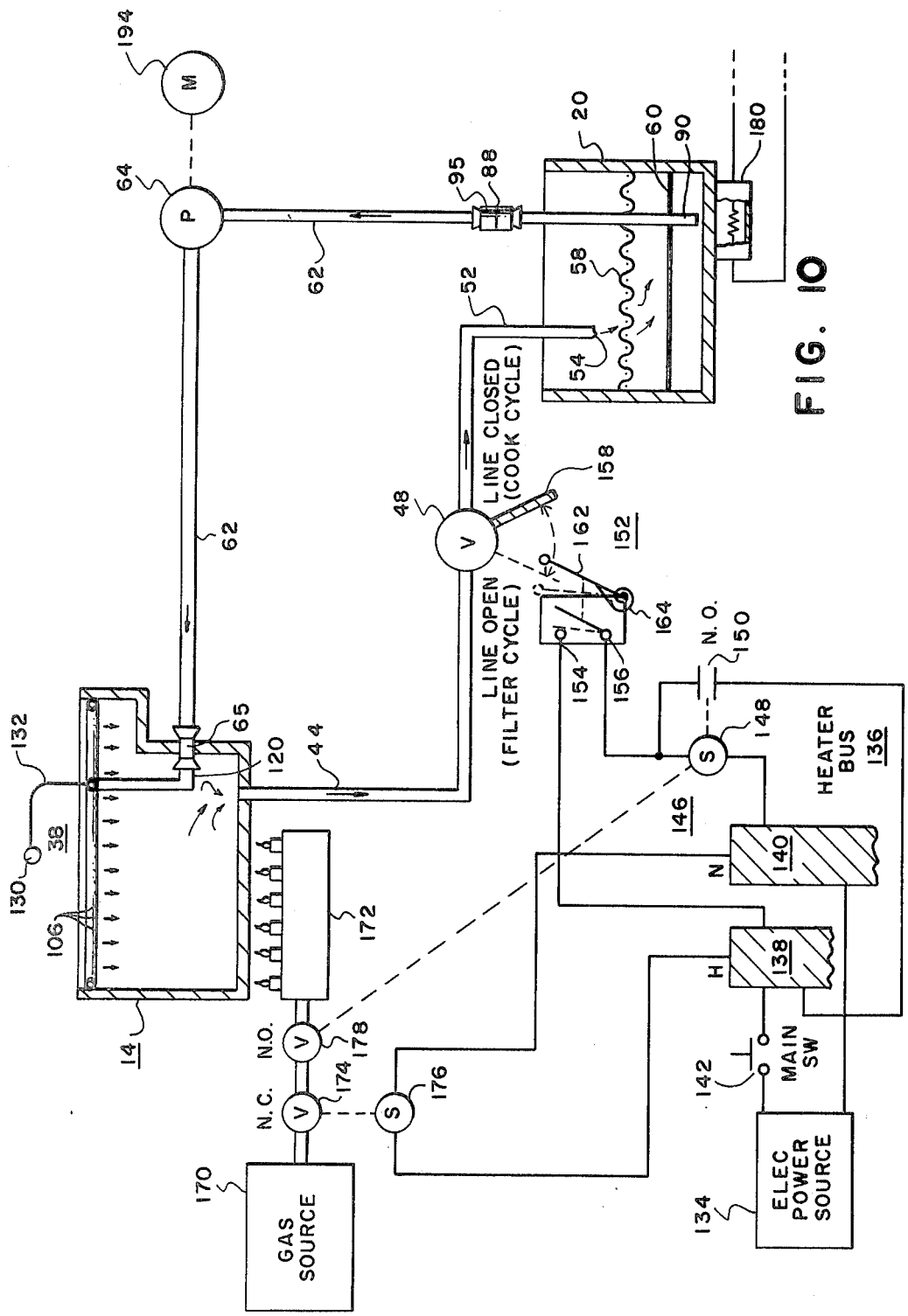

The return conduit 62 is joined in fluid circuit relation to the fry pots 14, 16 through quick connect-disconnect fluid coupling members 65, 66, respectively. The fluid coupling members 65, 66 are conventional in design and are typically constructed as illustrated in FIG. 10 of the drawing. The return conduit 62 includes a valve, either manual or electric, at each fry pot so that the cooking oil conveyed by the return conduit 62 may be selectively discharged into the respective fry pot unit 14, 16 which is currently undergoing the filter cycle. During the period that filtering is occurring, the cooking oil is continuously circulated through the drain conduit 52 and the return conduits 62. The filter cycle is continued until the cooking oil has been filtered sufficiently that the system may be shut down. At that point the drain valve for the selected fry pot unit is closed and the cooking oil is permitted to return to the fry pot, refilling it to the proper frying level.

The pump 64 is connected in series fluid circuit relation with the return conduit 62 for drawing the filtered cooking oil from the drain pan 20 and for forcing it through the return conduit 62 at a predetermined discharge pressure. The cooking oil is discharged through the shower apparatus 38 preferably at a velocity low enough to prevent aeration of the cooking oil. Aeration of the cooking oil reduces the effective life of the cooking oil. Although there is some slight aeration involved as the shower apparatus 38 directs jets of cooking oil along the sides of the fry pot 14, the filter cycle usually requires a relatively short operating period (typically three minutes) so that aeration is held to a minimum. Assuming that the pump is turned on before the shower apparatus is inserted (for example by an inexperienced operator) no safety hazard exists. The cooking oil is simply returned through the fluid coupling member 65 directly into the fry pot 14. Although the full cleaning potential of the system is not utilized when the shower apparatus is removed, the system is entirely safe, with the cooking oil being discharged harmlessly into the fry pot.

The drain pan 20 is rectangular in profile and includes edge portions which define a mouth 68 for receiving the cooking oil conveyed by the drain conduit 52. The sieve 58 includes vertical side surfaces 70, 72 and laterally extending flange portions 74, 76. The sieve 58 is removably suspended within the drain pan 20 by the engagement of the flange portions 74, 76 with the mouth 68 of the drain pan 20. The vertical side surfaces 70, 72 of the sieve 58 are disposed in nesting relation with the side surfaces of the drain pan.

Figure 4:
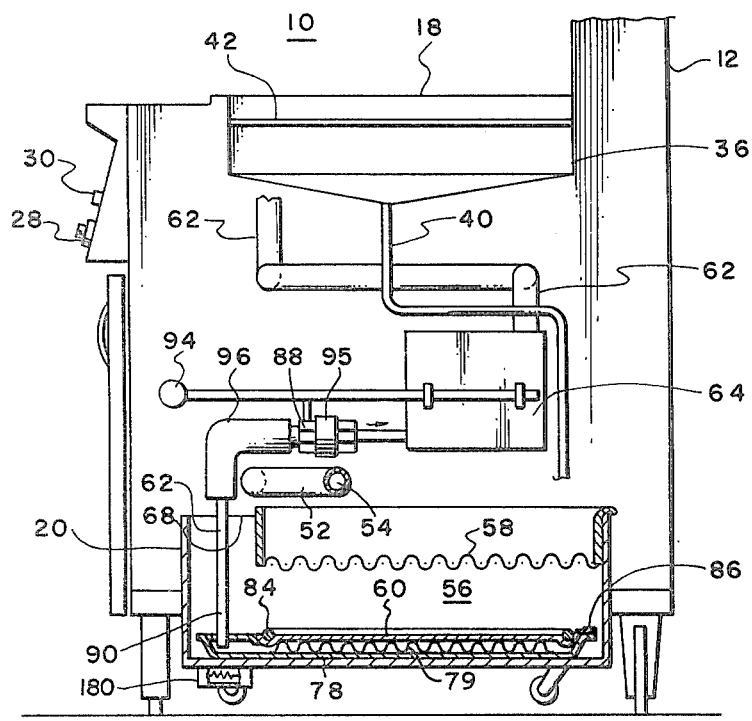
FIG. 4 is a side elevation view, partly cut away, of the drain pan arrangement of the cooking system of FIG. 1.
Figure 6:
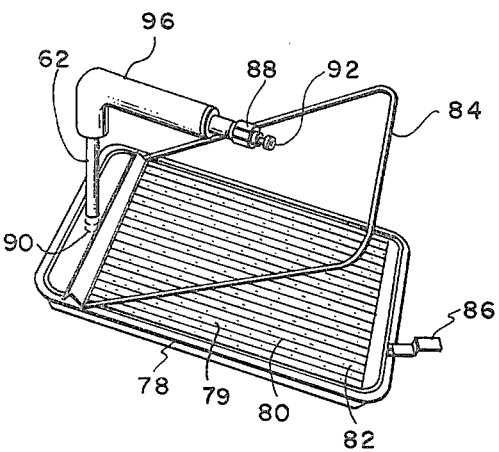
FIG. 6 is an isometric view which shows the details of the filter panel for the filter system illustrated in FIG. 4.

Referring now to FIG. 4 and FIG. 6 of the drawing, the filter assembly 56 includes the porous filter medium 60 which is supported in a filter pan 78 which sits on the bottom of the drain pot underneath the sieve 58. The filter pan 78 is essentially a shallow pan having an open mouth in which a convoluted element 79 rests. The element 79 is formed with perforated ridges 80 and grooves 82 which define a corrugated drain zone for supporting the porous filter medium 60. A bail 84 is pivotally secured to the filter pan 78 and the porous filter medium 60 is disposed over the support element 79 and intermediate the drain zone and the bail 84. A clamp 86 is provided for securing the bail 84 in compressive engagement with the porous medium 60 and the filter pan 78. A fluid coupling member 88 having an inlet port 90 and an outlet port 92 is secured to a support panel 91 with its inlet port 90 projecting inside of the filter pan 78 to admit cooking oil passed by the filter 60. The outlet port 92 of the coupling member 88 projects vertically within the drain pan 20 and laterally over the sieve 58. The open mouth of the filter pan 78 is partially closed by support panels 91, 93 which define a drainage window 97. The convoluted filter element 79 is supported at each end by the support panels 91, 93 and is held in place over the drainage window 97 by the bail 84.

As the cooking oil is drained through the filter assembly 56, coarse food particles are collected by the sieve 58 and relatively finer food particles are collected by the porous medium 60. After several filter cycles, the sieve and the porous medium will become saturated with the food particles and must be changed. The porous medium 60 may be removed quickly and safely by means of a quick release coupling member 94 which is mechanically coupled to a spring loaded receiver 95 of the coupling 88. Removal of the filter is accomplished by grasping the insulated handle 96 and pushing the quick release coupling member 94 to disengage the spring loaded receiver 95 thereby allowing the filter pan 78 to be withdrawn from the drain pan 20. Once the dirty filter has been removed, a clean filter assembly which has been previously prepared can be reinserted into the quick release fitting and is immediately ready for use. The hot filter element is allowed to cool before cleaning. It may be cleaned and changed in an uncongested area, without interfering with cooking operations being carried on in the adjacent fry pot 16.

Figure 3:
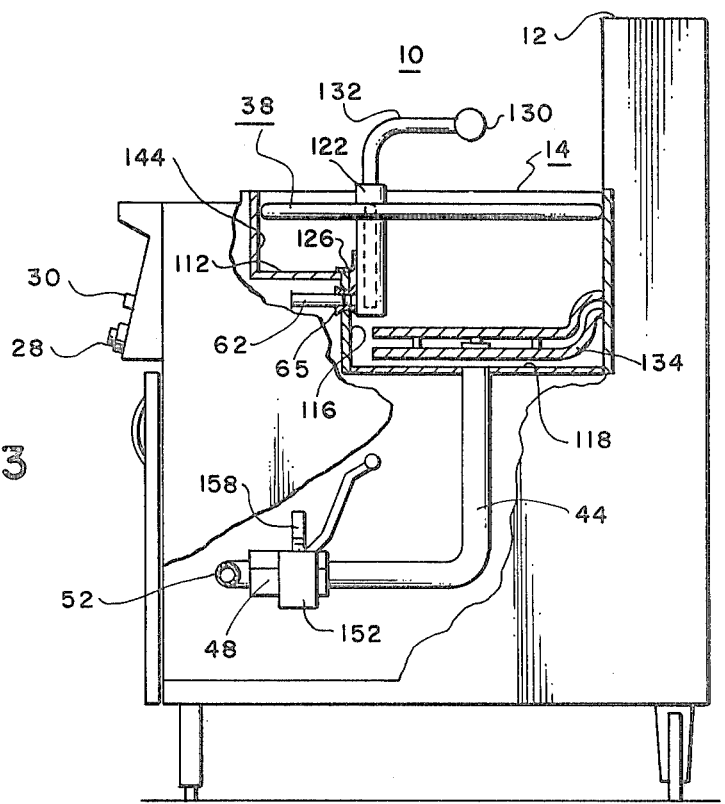
FIG. 3 is a side elevation view, partly cut away, which illustrates the fry pot arrangement of the cooking system of FIG. 1.
Figure 7:
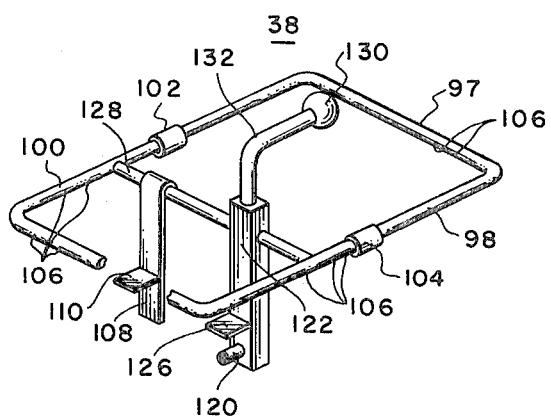
FIG. 7 is an isometric view which illustrates the detailed construction of the shower apparatus shown in FIG. 3.
Figure 8:
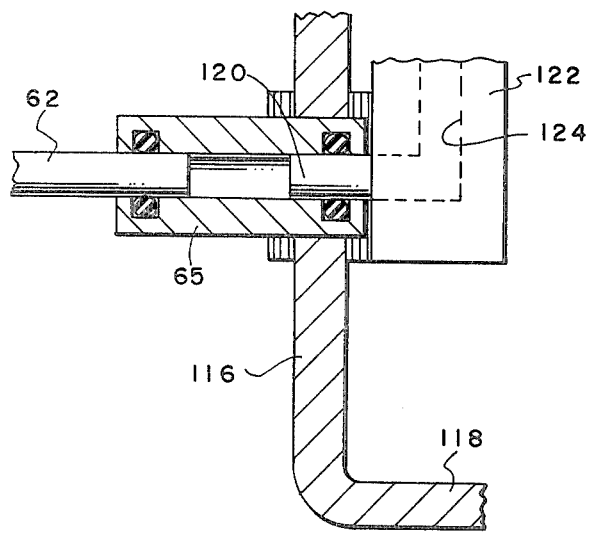
FIG. 8 is an elevation view, partly in section, of a typical quick-connect hydraulic connection utilized in the present invention.

Referring now to FIGS. 3, 7 and 8, the shower apparatus 38 is formed into a continuous tubular member 97 having side sections 98 and 100 which are laterally displaced with respect to each other in conformance with the lateral displacement of the interior side surfaces of the fry pot 14 for nesting engagement therewith. The tubular side sections 98, 100 are formed with corners to define a rectangular outline. The side sections are coupled together to define the continuous tubular member 97 by means of joints 102 and 104. The tubular side sections 98, 100 are substantially coextensive with the lateral peripheral dimensions of the corresponding fry pot interior surfaces thereby permitting nesting engagement of the side sections 98, 100 with the corresponding interior side surfaces of the fry pot 14. Each of the tubular side sections includes several outlet ports 106 which are arranged to discharge jets of cooking oil onto the adjacent interior side surface of the fry pot.

The shower apparatus 38 is mounted within the fry pot 14 by means of a supporting member 108 which includes a laterally projecting flange portion 110. This structure is adapted for engagement with a ledge portion 112 of an interior side surface of the fry pot 14. In this arrangement, the interior side surface is defined by the union of a vertically extending planar surface 114 which cooperates with the remaining interior side surfaces to define the mouth of the fry pot, and a vertically extending planar surface 116 which is disposed intermediate of the ledge 112 and the floor 118 of the fry pot. The mounting of the shower apparatus 38 is completed by inserting an inlet port 120 of a coupling member 122 into the quick disconnect coupling member 64. The coupling member 122 provides mechanical support for the shower apparatus 38 and includes a conduit section 124 which connects the return conduit 62 in fluid communication with the shower apparatus 38. The coupling member 122 includes a flange member 126 which is arranged to permit registration of the inlet port 120 of the coupling member 122 with the quick disconnect member 65 concurrently with engagement of the flange portions 126 and 110 with the ledge as the shower apparatus 38 is inserted into the fry pot 14.

Fluid communication with the continuous tubular member 97 is provided by a transverse tubular member 128 which also provides mechanical support therefor. The coupling member 122 is provided with a thermally insulated handle 130 which is connected to the coupling member 122 by means of a lever 132. The outlet ports 106 of the continuous tubular member 97 are carefully designed to provide a shower pattern which flushes the interior side surfaces of the fry pot 14 as cooking oil is pumped through the return conduit 62 through the shower apparatus 38. When the filtering has been completed, the drain valve 48 is closed and clean cooking oil is returned to the fry pot. The adjacent fry pot 16 is prepared for filtering by simply inserting the shower apparatus 38 and repeating the steps outlined above.

Changing the porous medium 60 is accomplished by pressing the release handle 94 against the spring loaded receiver 95 and pulling on the coupling member 88. This disconnects the filter assembly 56 from the pump 64. Next the caster-mounted drain pan is pulled out of the console 12. The sieve 58 is removed to permit withdrawal of the lower filter assembly. At this time the sieve may be emptied and cleaned if necessary. A spare filter pan 78 which has been previously prepared with a clean porous medium 60 is placed in the drain pan 20 and the sieve 58 is replaced. The drain pan is rolled back into the console where the flange portions 74, 76 engage corresponding flange portions of the console 12. After the spring loaded receiver 95 has been engaged by the fluid coupling member 88, the filter system is ready for use. Thus the filter can be replaced safely and quickly.

Figure 5:
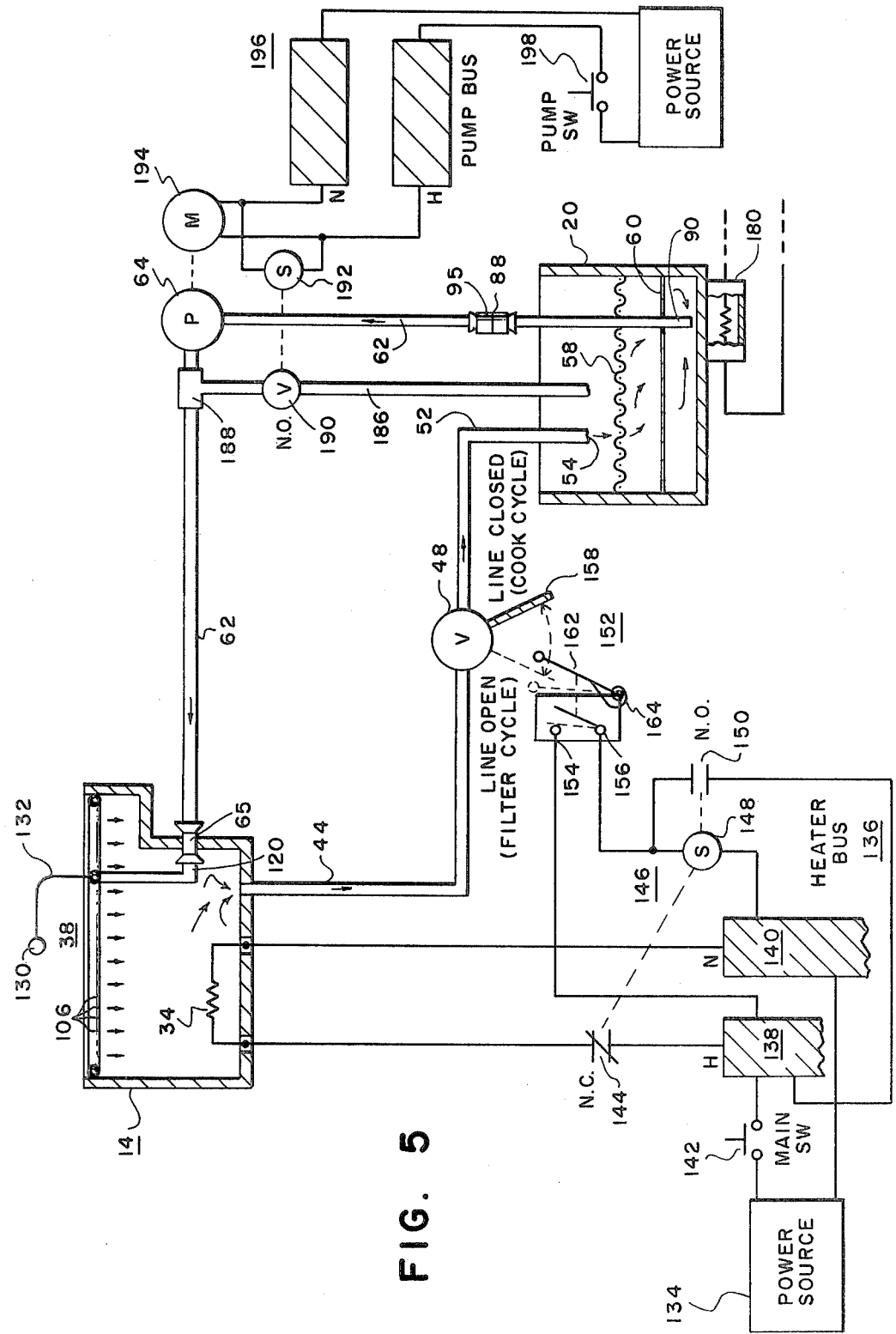
FIG. 5 is a schematic representation of the principal components of the cooking system illustrated in FIG. 1.

Referring now to FIG. 5 of the drawing, a control circuit is illustrated which permits the filter system described above to be implemented safely, that is, to be utilized without risk of injury to the operator or without risk of damage to the fry pot 14. In FIG. 5, the fry pot 14 is heated by the electrical heating element 34 in the conventional manner. Electrical power is applied to the heating element 34 from a power source 134 through a heater bus assembly 136. The heater bus assembly 136 includes a first electrical bus 138 for conducting electrical current and a second electrical bus 140 for returning electrical current conducted through the first electrical bus through the electrical heating element 34 back to the power source 134. An on-off switch 142 is electrically connected between the power source 134 and the first electrical bus 138 to permit manual control of the application of electrical current thereto. The heating element 34 is energized by the flow of current through the first heater bus 138 and through the normally closed contacts 144 of a power contactor assembly 146 which includes a solenoid assembly 148 and a pair of normally open contacts 150.

A safety switch assembly 152 is connected in series with the solenoid 148 to open and close a pair of electrical contacts 154 and 156 in response to the operating mode of the drain valve 48. The drain valve 48 includes an operating handle 158 which is mechanically coupled to the safety switch assembly 152 to cause the switch to open and close as the drain conduit 44 is opened and closed. The normally open contacts 150 of the power contactor assembly 146 are connected in parallel electrical relation with the contacts 154, 156 so that when the solenoid 148 is energized as the safety switch 152 is closed the solenoid 148 becomes "locked" and the normally closed contacts 144 are maintained in the open position, thereby interrupting the flow of current through the heater element 34. Since the solenoid 148 is locked by the normally open contacts 150, subsequent opening and closing of the drain valve 48 has no effect upon the disabled condition of the heating element 34. According to an important feature of the invention, the main switch 142 must be turned off thereby de-energizing the solenoid 148 so that the normally open contacts 150 are reopened, thereby allowing the contacts 144 to return to the normally closed condition. By this arrangement, resetting of the control system is accomplished by first turning the fry pot off and then back on to ensure that the operator exercises positive control before the heating system is re-energized. This control circuit circumvents the damage which would occur should the operator inadvertently close the drain valve 48 without first turning off the main switch 142.

According to one arrangement, the safety switch assembly 152 includes an actuator 162 which is coupled by resilient bias means 164 to hold the safety switch contacts 154, 156 in the open position when the drain handle 158 is moved to the closed position, and to close the contacts when the handle is moved to the open position.

Figure 9:
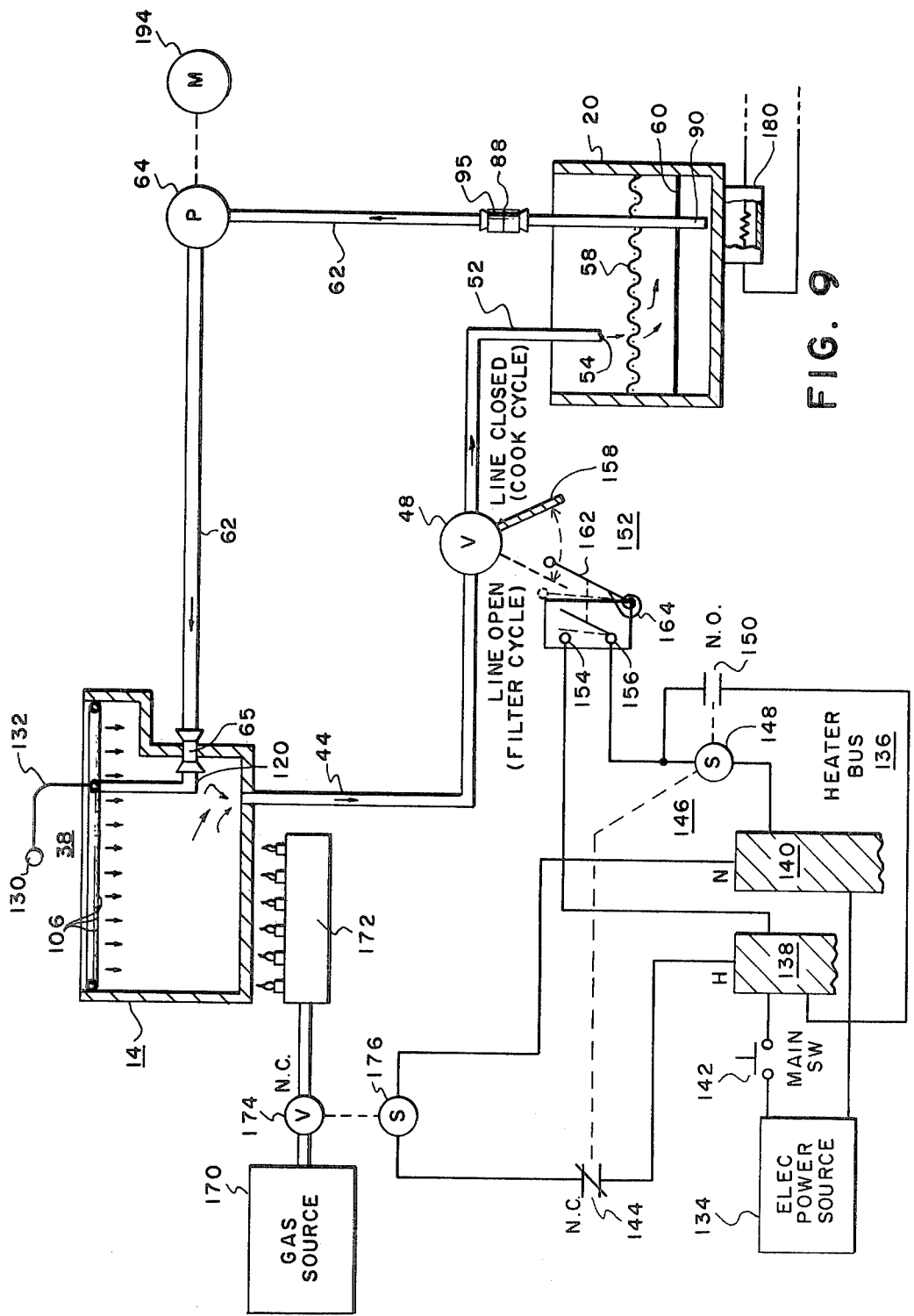
FIG. 9 is a schematic diagram similar to FIG. 5 which illustrates a control system for safely implementing the filter system of FIG. 1 in combination with a fry pot which is heated by a gas burner; and, FIG. 10 is a schematic diagram similar to FIG. 9 which illustrates an alternate control arrangement for a fry pot which is heated by a gas burner.

Referring now to FIG. 9 of the drawing, a control system for controlling the flow of gas from a gas source 170 to a gas burner 172 is illustrated. The control system includes a normally closed gas valve 174 and an electrical solenoid assembly 176 which is operably connected to the normally closed valve 174 to open it in response to the flow of current through the normally closed contacts 144. Assuming, however, that the main switch 142 is in the off position, the first electrical bus is not energized so that no current flows through the solenoid 176. In this case, the normally closed valve 174 remains closed and no gas is conveyed from the gas source 170 to the gas burner 172. During a cooking cycle, the main switch 142 is turned on which energizes the first electrical bus 138 whereupon current flows through the normally closed contacts of the solenoid 176 thereby opening the valve 174 to permit gas to flow through the burner 172. During this cycle the drain valve 48 is in the closed position to prevent the flow of cooking oil through the conduit 44. In the event that the drain valve 48 were to be opened accidentally or inadvertently during the cooking cycle, the safety switch 152 would close the electrical circuit between the contacts 158 and 160 thereby energizing the solenoid 148 to open the normally closed contacts 144 thereby interrupting power to the solenoid 176. When this occurs, the valve 174 returns to its normally closed de-energized position thereby interrupting the flow of gas from the gas source 170 to the gas burner 172 to prevent damage to the heat transfer surfaces of the fry pot 14. The normally open contacts 150 of the power contact assembly 146 are closed whereupon the solenoid 148 becomes "locked up" as the safety switch 152 is closed. Since the normally open contacts 150 are connected in parallel electrical relation with the safety switch 152, subsequent operation of the drain valve 48 has no effect upon the disabled condition of the gas burner 172. In order to reset the control system for a cooking cycle, the main switch 142 must be placed in the off position to remove power from the first electrical bus 138 so that the normally open contacts will be released as the solenoid 148 is de-energized. Of course, with the drain valve 48 in the line open position, the safety switch 152 is closed and it becomes impossible to enable the gas burner 172.

Turning now to FIG. 10 of the drawing, an alternate control arrangement is illustrated for the fry pot which is heated by a gas burner 172. In this arrangement, a normally open gas valve 178 is connected in series fluid circuit relation with the normally closed gas valve 174. The normally open gas valve 178 is closed by the flow of current through the solenoid 148 when the first electrical bus 138 is energized and the safety switch 152 is in the closed position. Assuming that the drain valve 48 is in the closed position so that the safety switch is open, the gas burner 172 receives gas from the gas source 170 through the normally open valve 178 and also through the normally closed valve 174 which is opened by the solenoid 176 when the on-off switch 142 is placed in the on position. Current flows from the first electrical bus through the solenoid 176 and is returned to the second electrical bus 140. The solenoid opens the normally closed valve 174 to permit gas to flow from the gas source through the normally open valve 178 to the gas burner. In the event the drain valve 48 is opened when the first electrical bus 138 is energized, the solenoid 148 is energized thereby closing the normally opened valve 178. At the same time, the normally open contacts of the solenoid 148 are closed which locks up the solenoid 148 until the first electrical bus is de-energized by returning the switch 142 to the off position.

It is sometimes desirable to drain the residual cooking oil from the return conduit 62 after a filter cycle. This is accomplished in the present invention by employing an auxiliary drain conduit 186 which is connected to the return conduit 62 by means of a tee joint 188 (refer to FIG. 5). A normally open, solenoid-controlled valve 190 is connected in the auxiliary drain conduit 186. The normally open valve 190 is closed by means of a solenoid 192 which is connected in parallel with an electrical motor 194 which drives the pump 64. The solenoid 192 and motor 194 are energized simultaneously through a pump bus assembly 196 and a pump switch 198 which selectively energizes the pump bus assembly 196. The auxiliary drain conduit 186 is arranged to discharge cooking oil into the drain pan 20. The solenoid 192 is electrically connected in parallel across the pump motor 194 to close the valve 190 to prevent drainage of cooking oil through the auxiliary conduit 186 during a cleaning cycle, and when de-energized, the valve 190 permits residual cooking oil to drain by gravity flow through the conduit 186 into the drain pan 20.

To prevent freeze-up of the system due to congealing of the shortening during an off cycle, a relatively low power heating system is employed. The return conduit 62 is drained through the pump 64 as discussed above. The pump 64 is kept warm by means of a small tubular heater (not shown), for example 15 watts at 24 VAC, wrapped around the pump casing. The input port 90 of the fluid coupling member 88 is kept cleared by means of a flat 40 watt silicon and rubber or fiberglass heater element 180 attached to the outside bottom of the drain pan 20. This heater does not heat the entire pan bottom, but only the area beneath the inlet port 90. Power may be transmitted to the heating element 180 by means of electrical contacts on either side of the drain pan 20, which engage spring loaded electrical contacts on either side of the pan support frame. Relatively low voltage (24 V) AC power is used to minimize the shock hazard.

It should be understood from the foregoing description that the frying apparatus and filter system of the present invention provides several important advantages over conventional systems. The fry pot and cooking oil may be cleaned safely without exposing the operator and his co-workers to the risk of burn injuries from the hot cooking oil. The fry pot is safeguarded from damage due to overheating during the filter cycle by a control circuit which disables the heating means at any time when the drain valve is open. Additional control circuitry is included to provide that reset to the cooking mode of operation can only be accomplished by first turning the heating means off and then back on to insure that the operator exercises positive control before the heating system may be energized again. The filter system is conveniently enclosed within a compartment of the console so that cooking operations may be carried on without interference with an adjacent fry pot as the flushing, draining and filtering process occurs.

Certain preferred embodiments of the invention have been described in detail. It should to be understood, however, that the invention is not limited to the embodiments disclosed, but is capable of numerous modifications and substitution of parts and elements without departing from the spirit of the invention as defined by the appended claims.

What is claimed is:

1. A system for controlling the flow of gas from a gas source to a gas burner, the system comprising, in combination:

a normally closed gas valve having an electrical solenoid assembly connected to open the valve in response to the flow of electrical current through the solenoid;

a normally open gas valve having an electrical solenoid assembly connected to close the valve in response to the flow of electrical current through the solenoid assembly, the solenoid assembly including a pair of normally open electrical contacts coupled to the solenoid assembly to form a closed electrical circuit in response to the flow of electrical current through the solenoid;

the normally closed gas valve being connected in series fluid circuit relation with the normally open gas valve;

the series connected combination of the normally closed gas valve and the normally open gas valve being connected in series fluid circuit relation with the gas burner, the series connected combination having an inlet port disposed upstream of the valves to admit the flow of gas from the gas source;

a first electrical bus for conducting electrical current;

an on-off switch connected to permit manual control of the application of electrical current from an external power source to the first electrical bus;

a second electrical bus for returning electrical current conducted through the first electrical bus to the external power source;

the electrical solenoid of the normally closed gas valve being electrically connected to conduct current from the first electrical bus to the second electrical bus;

a switch having a pair of electrical contacts and an actuator operatively coupled thereto for opening and closing the contacts;

the electrical contacts of the switch being connected in series electrical relation between the first electrical bus and the solenoid connected to the normally open gas valve;

the solenoid of the normally open gas valve being connected in series electrical relation between the switch and the second electrical bus; and, the normally open electrical contacts of the solenoid connected to the normally open gas valve being electrically connected in parallel circuit relation with the electrical contacts of the switch wherein the actuation of said normally open valve is non responsive to the opening and closing of the contacts after said contacts are first closed.

* * * * *